(12) United States Patent
Huang et al.

(10) Patent No.: US 8,666,255 B2
(45) Date of Patent: Mar. 4, 2014

(54) CIRCUITS, ARCHITECTURES, APPARATUSES, SYSTEMS, AND METHODS FOR MERGING OF MANAGEMENT AND DATA SIGNALS, AND FOR RECOVERY OF A MANAGEMENT SIGNAL

(75) Inventors: Yuanjun Huang, Chengdu (CN); Jianhua Zhou, Chengdu (CN); Yaxi Xiong, Chengdu (CN); Shengzhong Zhang, Chatsworth, CA (US)

(73) Assignee: Source Photonics, Inc., Chatsworth, CA (US)

( * ) Notice: Subject to any disclaimer, the term of this patent is extended or adjusted under 35 U.S.C. 154(b) by 219 days.

(21) Appl. No.: 13/210,203

(22) Filed: Aug. 15, 2011

(65) Prior Publication Data
US 2012/0170927 A1 Jul. 5, 2012

(30) Foreign Application Priority Data

Dec. 30, 2010 (CN) .......................... 2010 1 0614180
Dec. 30, 2010 (CN) ...................... 2010 2 0689877 U

(51) Int. Cl.
*H04B 10/00* (2013.01)
*H04B 10/08* (2011.01)

(52) U.S. Cl.
USPC ................................ 398/135; 398/17; 398/22

(58) Field of Classification Search
USPC ...................... 398/135–139, 17, 22
See application file for complete search history.

(56) References Cited

U.S. PATENT DOCUMENTS

| 5,436,750 | A * | 7/1995 | Kawano ........................... 398/10 |
| 7,200,336 | B2 | 4/2007 | Yu et al. |
| 7,650,077 | B2 | 1/2010 | Yu et al. |
| 7,765,259 | B2 | 7/2010 | MacVarish |
| 2005/0089334 | A1 | 4/2005 | Regev et al. |
| 2005/0232635 | A1* | 10/2005 | Aronson et al. ............... 398/135 |
| 2008/0046768 | A1* | 2/2008 | Chuang ......................... 713/300 |
| 2009/0116846 | A1* | 5/2009 | Noble ............................ 398/135 |
| 2009/0214221 | A1* | 8/2009 | Li et al. ......................... 398/136 |
| 2009/0304384 | A1 | 12/2009 | Li |
| 2010/0095110 | A1* | 4/2010 | Noble et al. ................... 713/153 |
| 2010/0153550 | A1 | 6/2010 | Diab et al. |

FOREIGN PATENT DOCUMENTS

CN 101677419 A 3/2010

OTHER PUBLICATIONS

Wen Li; "Integrated Optical Transceiver and Optical Network Management"; esp@cenet; Chinese Publication No. CN101677419 (A); Publication Date: Mar. 24, 2010; Abstract of CN101677419 (A); esp@cenet Database—http://worldwide.espacenet.com/.

* cited by examiner

*Primary Examiner* — Daniel Dobson
(74) *Attorney, Agent, or Firm* — Andrew D. Fortney

(57) ABSTRACT

An optical and/or optoelectrical transceiver and system are disclosed that enable parallel transmission of data and management signals via an optical fiber without affecting data signal transmissions transmitted on the optical fiber. Furthermore, the present transceiver and system provide a fault diagnosis function for an optical fiber link. The transceiver and system generally comprise an interface, an intersecting transmission management unit, a driver, a management signal driving unit, an optical transmitter, an optical receiver, an amplifier, a management signal recovery unit, a management unit, and optionally, a power supply unit.

24 Claims, 5 Drawing Sheets

CIRCUITS, ARCHITECTURES, APPARATUSES, SYSTEMS, AND METHODS FOR MERGING OF MANAGEMENT AND DATA SIGNALS, AND FOR RECOVERY OF A MANAGEMENT SIGNAL

RELATED APPLICATIONS

This application claims the benefit of Chinese Patent Application Nos. 201020689877.3 and 201010614180.4, both filed on Dec. 30, 2010, each of which is incorporated herein by reference as if fully set forth herein.

FIELD OF THE INVENTION

The present invention generally relates to the field of optical and/or optoelectrical communications. More specifically, embodiments of the present invention pertain to circuits, architectures, systems, and methods for data communications in a network using an optical or optoelectrical transceiver which realizes parallel transmission of data and management signals via optical fibers without affecting data signal transmissions transmitted via the optical fiber. Furthermore, the present invention provides a fault diagnosis function for an optical fiber link.

BACKGROUND

With rapid development of information technology, data throughput has increased. As a result, networks tend to include equipment with greater data throughput or more efficient data transmission methods. Optical fiber-based communications are widely applied in networks as an effective data transmission method. The structure of networks is becoming more complicated with the continuous development of information technology. Therefore, it is important to effectively manage and tackle errors in large, complicated network systems.

A host device of an optical network is interconnected with optical fibers via a transceiver which (1) converts an electrical signal from the host device to an optical signal and (2) transmits an electrical signal to the host from an optical signal. Since the host in the optical network is connected to the optical fiber via the transceiver, the optical fiber is a critical medium for connecting the host device to the optical network. The optical fiber interface is a key factor with regard to managing optical fiber transmissions over the optical fiber network.

If the transceiver is capable of allowing management signal transmission without affecting data signal transmission, the capability of management and error diagnosis in the optical fiber network is effectively developed. Existing solutions to this problem involve management of the host system via a special network-manageable transceiver, which generally occupies system resources, reduces bandwidth, and increases the cost of the host system.

This "Background" section is provided for background information only. The statements in this "Background" are not an admission that the subject matter disclosed in this "Background" section constitutes prior art to the present disclosure, and no part of this "Background" section may be used as an admission that any part of this application, including this "Background" section, constitutes prior art to the present disclosure.

SUMMARY

Embodiments of the present invention relate to circuitry, architectures, apparatuses, systems, and methods for merging management and data signals in an optical or optoelectronic network, and for recovery of a management signal. More specifically, embodiments of the present invention relate to merging of management and data signals, and for recovery of a management signal in a network using an optical or opto-electrical transceiver. The system (e.g., a transceiver) generally comprises (a) an interface, (b) an intersecting transmission management unit, (c) a driver, (d) a management signal driving unit, (e) an optical transmitter, (f) an optical receiver, (g) an amplifier, (h) a management signal recovery unit, (i) a management unit, and optionally (j) a power supply unit.

In addition, the system (e.g., an optical transceiver) of the present invention may comprise (a) a management unit to manage transmission and receipt of all signals; (b) a management signal driving unit, to receive and respond to a management signal transmitted by the management unit; (c) an intersecting transmission management unit, to respond to a control signal transmitted by the management unit and to realize the intersecting transmission of a received data signal; (d) a driver, to respond to a data signal transmitted by the intersecting transmission management unit and the management signal transmitted by the management signal driving unit, and transmit a modulation signal by a superposition (e.g., overlapping of waves) of the data signal and the management signal; (e) a transmitter, to respond to the modulation signal from the driver and transmit an optical signal; (f) a receiver, to receive an external optical signal and convert the external optical signal to an electrical signal; (g) an amplifier, to respond to the electrical signal from the receiver and transmit the electrical signal to the intersecting transmission management unit (optionally after transformation and amplification); and (h) a management signal recovery unit, to recover a management signal (e.g., a network management signal) from an image signal corresponding to the electrical signal, and to transmit the recovered management signal to the management unit. The architectures and/or systems generally comprise those that include a circuit embodying one or more of the inventive concepts disclosed herein.

The present invention advantageously relies on the modulation function of a driver to realize an effective merger of management and data signals. In addition, the present invention advantageously recovers a management signal in the receiver using a band-pass filter and a dynamic comparison. Furthermore, the present invention advantageously provides management of a proximal or distal optical converter and a distal end system. Compared to conventional solutions, implementations of the present invention are more effective and provide efficient control of components in the network.

In various embodiments of the present invention, the management signal driving unit receives the management signal from the management signal driving unit and modulates the received signal to an analog signal via a current supply. When the management signal driving unit responds to the management data from the management unit and transmits the management signal, the management signal will be coupled into a modulation current supply. Subsequently, the superposition of the management signal and the data signal is completed. In various embodiments, the data signal is a high-frequency signal having a frequency of 155 Mbps to 10.3125 Gbps. In further embodiments, the management signal is a low-frequency signal having a maximum frequency of about 100 kbps. Preferably, an amplitude ratio of the data signal to the management signal is from about 10:1 to about 10:2.

In other embodiments of the present invention, the management unit comprises a micro-controller, a transmission data storage unit and a transmission command storage unit. Alternatively, the management unit may comprise a microprocessor, a digital signal processor (DSP), a field programmable gate array (FPGA), or an application-specific integrated circuit (ASIC). Management signals and management command(s) to be transmitted to a distal end may be respectively stored in the transmission data storage unit and/or the transmission command storage unit in the management unit. The management unit transmits data stored in the transmission data storage unit and the transmission command storage unit to the management signal driving unit. The management unit receives the management signal from the management signal recovery unit, and the micro-controller stores received management data in the transmission data storage unit and the transmission command storage unit, respectively.

In further embodiments of the present invention, the management signal recovery unit comprises a band-pass filter, a threshold level setting unit and a comparator. The band-pass filter is connected to the threshold level setting unit and the comparator, and the threshold level setting unit is connected to the comparator. A pass band of the band-pass filter is configured at a frequency or frequency range that similar to the management signal frequency).

In certain embodiments, the system (e.g., transceiver) comprises an interface that connects the transceiver and the host. The management unit of the host reads management data transmitted by or from the transmission data storage unit, which is configured in the transceiver management unit, and subsequently writes the proximal management data to be transmitted. The management unit of the host reads management command(s) transmitted by or from the transmission command storage unit in the transceiver management unit and writes distal management command(s) to be transmitted.

There are several packaging forms for transceivers with the interface, such as GBIC-SFF-, SFP-, SFP+-, XFP-, X2-, XENPAK- and transponder-compliant packages.

In various embodiments of the system (e.g., transceiver), the management unit communicates with the management signal driving unit and the management signal recovery unit via a serial port to enable transmission and receipt of the management data. The host management unit communicates with the transceiver management unit via the serial port to enable management data reading and transmission and/or receipt of the management command(s) in an optical network.

The present invention provides functions of electrical interface loopback, proximal optical interface loopback, distal optical interface loopback and power monitor functions. In addition, the present invention recognizes management and fault diagnosis over an optical fiber link.

In one embodiment, the electrical interface loopback function is provided by a proximal host management unit that transmits a control signal via the proximal transceiver and the fiber connecting proximal and the distal transceivers to enable an electrical interface loopback in the distal transceiver. The electrical signal output transmitted by the distal host is returned directly to the distal host via the intersecting transmission management unit of the distal transceiver to facilitate management and fault diagnosis over the fiber link.

The proximal optical interface loopback function is provided by the proximal host management unit to enable proximal optical interface loopback via the management interface of the proximal transceiver, in which a data signal transmitted from the distal transceiver via fiber to the proximal transceiver (instead of the proximal host) is returned to the distal transceiver via an intersecting transmission management unit, so as to facilitate management of the fiber link and fault diagnosis over proximal and distal fiber links.

The distal optical interface loopback function is provided by the proximal host management unit that transmits the control signal via the proximal transceiver and the fiber connecting the proximal and distal transceivers to enable and/or control the optical interface return of data from the distal transceiver. The received data signal is transmitted or returned directly to the driver of the distal transceiver (rather than the distal host) through the intersecting transmission management unit, and then the distal transmitter transmits received data to the proximal transceiver to facilitate management and fault diagnosis over the fiber link.

The system (e.g., transceiver) of the present invention enables the data signal and the management signal to be transmitted in parallel via fibers without affecting the data signal transmission. Furthermore, the present system enables parallel transmission over one fiber of the data signal and the management signal at the same wavelength. In one embodiment, the management signal includes a real-time status parameter of the proximal and distal transceivers, the proximal host management signal being transmitted to the distal transceiver, and the proximal host management signal being transmitted to the distal host.

In addition, the system (e.g., transceiver) realizes and/or recognizes fault diagnosis over the fiber link in an optical network. The present system enables supply voltage monitoring via a voltage sensing unit and the management unit. The supply voltage monitoring function monitors the voltage and/or voltage status of the host device and the transceiver itself. If the working voltage of the transceiver is lower than the normal voltage, or in the case of sudden loss of power, the power storage unit in the transceiver will supply power to continue normal work or function(s) for a period of time. In addition, the power monitoring function transmits a signal indicating an abnormal state to the distal host device during such period to recognize or enable fault diagnosis over the fiber link.

Furthermore, the system (e.g., transceiver) of the present invention enables parallel transmission of the data signal and the management signal on the same fiber without any impact on the data signal transmission or change in wavelength. The present system further provides an internal network monitoring function, and eliminates the need of management units specifically used for network management, which reduces cost, saves network resources, and effectively improves the management of an optical network. For the purpose of further improvement of management over the fiber link, the present system provides fault diagnosis function over the fiber link, which effectively reduces the diagnosis time of the fiber links.

The system (e.g., transceiver) of the present invention may rely on a modulation function of the transceiver driver, and effectively merges or mixes the data signal and management signal, and subsequently recovers the management signal at the receiving end through the low-pass filtering and the dynamic comparison. Compared with existing solutions, the present (transceiver) system is simple but more effective in implementation and cost control.

The system (e.g., transceiver) of the present invention lays a solid foundation for the development of an intelligent optical network in the future. These and other advantages of the present invention will become readily apparent from the detailed description of various embodiments below.

DETAILED DESCRIPTION

Figure 1:
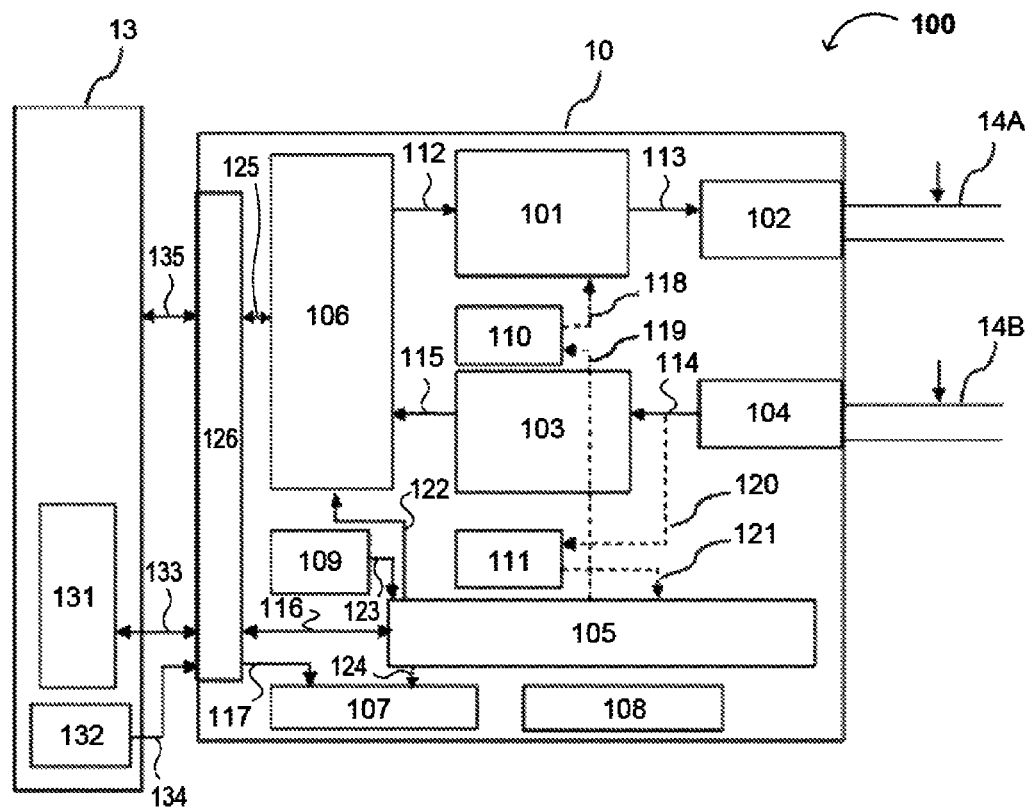
FIG. 1 is a diagram showing an exemplary system (transceiver) of the present invention.

Reference will now be made in detail to various embodiments, examples of which are illustrated in the accompanying drawings. While the invention will be described in conjunction with the embodiments provided below, the embodiments are not intended to limit the invention. On the contrary, the invention is intended to cover alternatives, modifications and equivalents that may be included within the scope of the appended claims. Furthermore, in the following detailed description, numerous specific details are set forth in order to provide a thorough understanding of the present disclosure. However, the present invention may be practiced without these specific details. In other instances, well-known methods, procedures, components, and circuits have not been described in detail so as not to unnecessarily obscure aspects of the present disclosure.

Some portions of the detailed descriptions which follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

All of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer, data processing system, logic circuit or similar processing device (e.g., an electrical, optical, or quantum computing or processing device), that manipulates and transforms data represented as physical (e.g., electronic and/or optical) quantities. The terms refer to actions, operations and/or processes of the processing devices that manipulate or transform physical quantities within the component(s) of a system or architecture (e.g., registers, memories, other such information storage, transmission, processing or display devices, etc.) into other data similarly represented as physical quantities within other components of the same or a different system or architecture.

Furthermore, for the sake of convenience and simplicity, the terms "data" and "information" may be used interchangeably, as may the terms "connected to," "coupled with," "coupled to," and "in communication with" (which terms also refer to direct and/or indirect relationships between the connected, coupled and/or communicating elements unless the context of the term's use unambiguously indicates otherwise), but these terms are also generally given their art-recognized meanings.

Furthermore, all characteristics, measures or processes disclosed in this document, except characteristics and/or processes that are mutually exclusive, can be combined in any manner and in any combination possible. Any characteristic disclosed in the present specification, claims, Abstract and/or Figures can be replaced by other equivalent characteristics or characteristics with similar objectives, purposes and/or functions, unless specified otherwise. Each characteristic is generally only an embodiment of the invention disclosed herein.

Referring to FIG. 1, an optical transceiver 10 comprises an interface 126, an intersecting transmission management unit 106, a driver 101, a management signal driving unit 110, an optical transmitter 102, an optical receiver 104, an amplifier 103, a management signal recovery unit 111, a management unit 105 and a power supply unit 107. The transceiver 10 also comprises a power storage unit 108 and a system voltage sensing unit 109 that are connected to management unit 105.

The intersecting transmission management unit 106 is connected to a host 13 via the interface 126. The intersecting transmission management unit 106 is also connected with the driver 101, which is connected to the transmitter 102. In various embodiments, the driver 101 comprises laser driver circuitry, configured to output a bias current that drives a laser or diode, and transmitter 102 comprises an optical subassembly, which may comprise an electron absorption modulator and a laser diode, such as a light-emitting diode (LED), adapted to transmit an optical signal (e.g., pulses) on the fiber-optic link from electronic signals received from driver 101. Management unit 105 is connected to the management signal driving unit 110, and the driving unit 110 is connected to the driver 101.

The optical receiver 104 is connected to the amplifier 103, and the amplifier 103 is connected to the intersecting transmission management unit 106. In various embodiments, the receiver 104 comprises a photodiode configured to receive optical data and convert the optical data into electrical data, and the amplifier 103 comprises a transimpedance amplifier configured to amplify the electronic data and provide an electrical signal to the electrical interface 126. In addition, the optical receiver 104 is connected to the management signal recovery unit 111, and the management signal recovery unit 111 is connected to the management unit 105. The management unit 105 is connected to (i) the host 13 via the interface 126 and the power unit 107 via the signal 124, and (ii) the intersecting transmission management unit 106. Lastly, the voltage sensing unit 109 (which may be a conventional voltage sensor) may be configured to determine a power applied to or present in the transceiver 10 and transmit information via the signal 123 regarding the power to the management unit 105.

In various embodiments, the system 100 comprises (i) a host 13, the host 13 having a power supply 132 and a management unit 131, and (ii) a transceiver 10, the transceiver 10 comprising an interface (e.g., a host interface) 126, an intersecting transmission management unit 106, a driver 101, a management signal driving unit 110, a transmitter 102, a receiver 104, an amplifier 103, a management signal recovery unit 111, a management unit 105, a power supply unit 107, a power storage unit 108 and a system voltage sensing unit 109.

As shown in FIG. 1, the driver 101 responds to (i) a data signal 112 from the host 13, delivered by the intersecting transmission management unit 106, and (ii) a management signal 118 from the management signal driving unit 110. In response thereto, a signal 113 (e.g., a modulation signal) is transmitted to transmitter 102. The data signal 112 may be a high-frequency signal with a frequency of about 155 Mbps to about 10.3125 Gbps, and the management signal 118 may be a low-frequency signal with a maximum frequency of about 100 Kbps. The amplitude ratio of the data signal to the management signal 118 may be from about 10:1 to about 10:2.

Figure 2:
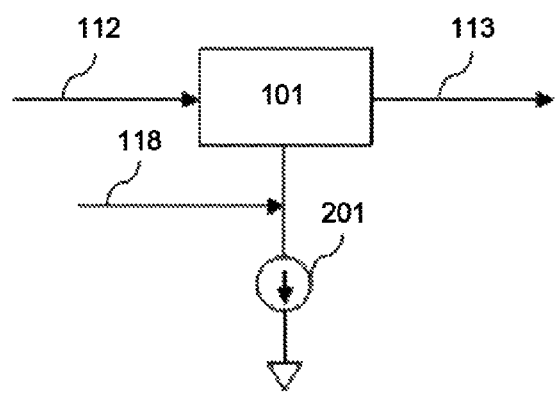
FIG. 2 is a diagram showing an embodiment of the present system merging data and management signals.

An exemplary embodiment of circuitry configured to merge or mix the data signal 112 and the management signal 118 in the transceiver 10 is shown in FIG. 2, in which data signal 112 (e.g., a digital signal) is transmitted to driver 101 of the transceiver 10 (FIG. 1) by the host 13 via the intersecting transmission management unit 106. FIG. 2 further shows management signal 118 (e.g., an analog signal), which is delivered from the management signal driving unit 110 (FIG. 1) of the transceiver 10 in response to input from the management unit 105 (FIG. 1). A resulting analog modulation signal 113 from the data signal 112 and the management signal 118 is provided by a modulation function of the driver 101.

A current supply 201 for modulation (e.g., of an output of the driver 101) is provided to the driver 101. When the driver 101 receives the data signal 112, the data signal 112 is switched or converted to an analog signal after modulation by the modulation current supply 201. If the management signal driver unit 110 (FIG. 1) delivers a management signal 118 in response to the management unit 105, the management signal 118 will be automatically coupled by the modulation current supply 201 to complete a superposition (or merger or mixing) of the data signal 112 and the management signal 118.

Figure 3:
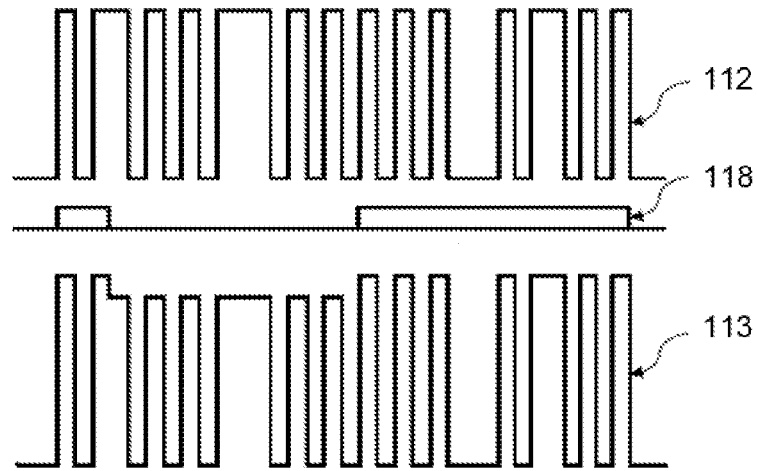
FIG. 3 is a diagram showing an exemplary embodiment of the present data signal, management signal, and signal superposed by the data signal and the management signal after modulation by a driver.

FIG. 3 shows exemplary waveforms at certain nodes in FIG. 2, in which data signal 112, management signal 118, and output signal 113 (e.g., a modulation signal) demonstrate superposition (or mixing) of the data signal 112 and the management signal 118 after modulation by the driver 101 (FIGS. 1-2). For example, FIG. 3 shows an example of a modulation signal 113 to be transmitted by the transmitter 102 (FIG. 1). As shown in FIG. 3, an amplitude superposition of the data signal 112 and the management signal 118 forms the superposed (e.g., mixed or merged) signal 113, in which the amplitude ratio of the data signal 112 to the management signal 118 may be about 10:1 to about 10:2.

The variations in the signal amplitudes of the data signal 112 and the modulation signal 113 are generally minimal. As a result, it is impossible to misjudge signals at the receiving end by the amplitude, when attempting to identify a signal carrying data. However, the difference in amplitude between the data signal 112 and the mixed modulation signal 113 is sufficient for sensing circuitry at the receiving end to easily distinguish when the modulation signal 113 has been mixed with an active management signal 118.

Referring back to FIG. 1, the management signal driving unit 110 receives a management signal 119 from the management unit 105, then in accordance with a signal modulation amplitude set mode of the driver 101, management signal driving unit 110 converts the management signal 119 to an analog signal 118 to be merged or mixed with the data signal 112 in the driver 101.

Figure 4:
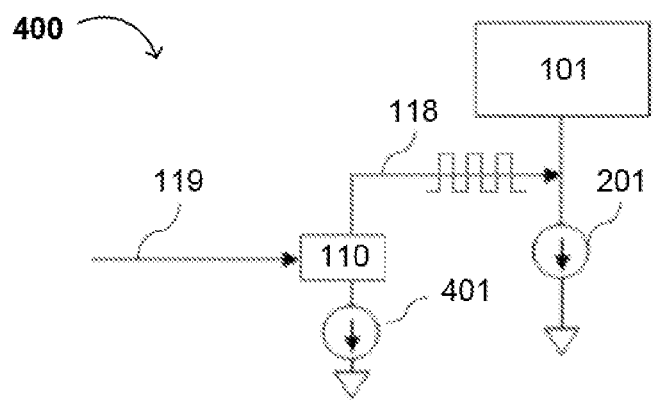
FIG. 4 shows an exemplary management signal driving system.

FIG. 4 shows an exemplary embodiment of a driving system 400 for the management signals 118 and 119, in which the management signal (e.g., a digital signal) 119 is transmitted by the management unit 105 (FIG. 1). A management signal (e.g., an analog signal) 118 is transmitted by a management signal driving unit 110, in response to the management signal 119. Thus, management signal driving unit 110 may comprise a digital-to-analog converter (DAC). Management signal 118 is driven by a current supply 401 coupled to the management signal driving unit 110. Management signal driving unit 110 thus may comprise the current supply 401, which is used to modulate the management signal 118. A current supply 201 is used for modulation of an output signal (e.g., modulation signal 113 by driver 101. After receiving management signal 119 from the management unit 105 (FIG. 1), the management signal driving unit 110 (FIG. 4) modulates the management signal 119 to the management signal 118 via the signal current supply 401. The management signal 118 will be automatically coupled to the modulation current supply 201 of the driver 110. An amplitude ratio of the data signal and the management signal is, for example, about 10:1 to about 10:2.

Management information or data can be conveyed by modulation signal 113 via the amplitude change in signal 113, a frequency at which the modulation occurs, and/or a period of time during which the modulation occurs. In one example, an amplified change of approximately 10% corresponds to a first state, an amplified change of approximately 20% corresponds to a second state, and no change corresponds to an inactive state. Alternatively, an amplified change of 10-20% corresponds to an active state of the management signal (in which case management information may be conveyed by the frequency and/or duration of the active management signal), and no change corresponds to an inactive state.

Referring back to FIG. 1, transmitter 102 transmits an optical signal (e.g., to a network device) in response to the modulation signal 113 from the driver 101, and the optical signal includes both the data signal 112 and the management signal 118.

As shown in FIG. 1, the receiver 104 responds to an optical signal transmitted over an optical fiber 14B (e.g., from a network device), and receiver 104 subsequently converts the optical signal to an electrical signal 114. Both the optical signal 14A and the electrical signal 114 of FIG. 1 can be formed by superposition (or merger or mixing) of a data signal (e.g., similar to signal 112) and a management signal (e.g., similar to signal 118), to form a type of signal similar to modulation signal 113, as shown in FIG. 3.

The amplifier 103 responds to the electrical signal 114 from the receiver 104, as shown in FIG. 1. After signal transformation and amplification, the received electrical signal 115 is sent to the intersecting transmission management unit 106. The electrical signal 114 may take the form of a modulation signal similar to signal 113, resulting from superposition of a data signal and a management signal, as shown in FIG. 3.

The management signal recovery unit 111 (FIG. 1) responds to an image signal 120 from the electrical signal 114, and recovers the management signal 118 through a bandpass filtering and a dynamic comparison. Thus, the management signal recovery unit 111 may comprise a band-pass filter, configured to remove relatively low and high frequency data signals from the management signal, and a comparator configured to determine an amplitude (or power or voltage) of the filtered management signal. Also, in various embodiments, the image signal 120 may be the same as or different from electric signal 114. In one embodiment, the image signal 120 is a substantial duplicate or copy of electrical signal 114. Subsequently, the management signal recovery unit 111 transmits recovered management signal 121 to the management unit 105, as shown in FIG. 1.

Figure 5:
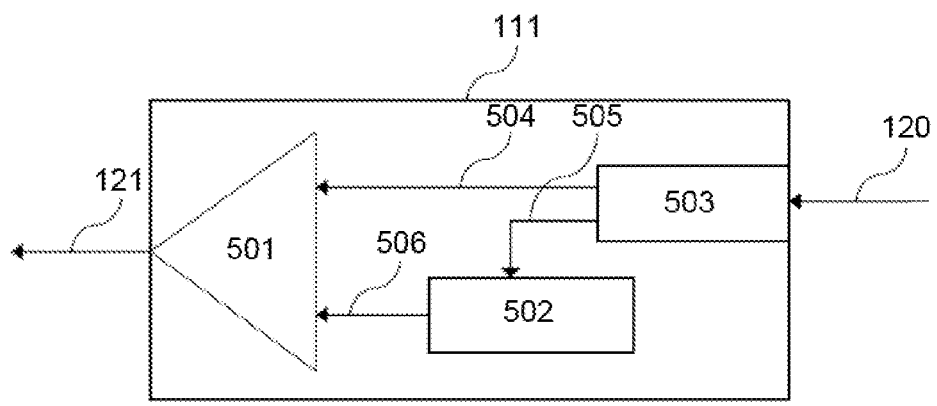
FIG. 5 shows an exemplary hardware scheme for recovery of a distal management signal.

FIG. 5 shows an exemplary embodiment of a management signal recovery unit 111 for the present transceiver, in which an image signal 120 is received from the receiver 104 (FIG. 1). The management signal 121, a component of image signal 120, is recovered by management signal recovery unit 111. The management signal recovery unit 111 comprises a band-pass filter unit 503, a threshold level setting unit 502, and a comparator 501. The band-pass filter 503 is connected to the threshold level setting unit 502 and the comparator 501, and the threshold level setting unit 502 is connected to the comparator 501. The management signal recovery unit 111 receives image signal 120 which generally includes a high-frequency data signal and a low frequency management signal. Image signal 120 (which may be the same as electrical signal 114) passes through the band-pass filter 503 of the management signal recovery unit 111. A pass band of the band-pass filtering unit 503 is configured at a frequency that is lower than the data signal frequency but higher than the management signal frequency. Therefore, when the electrical signal 120 (or electrical signal 114) passes through the band-pass filter 503, the high-frequency data signal and the noise can be excluded, and output signals 504 and 505 include only the low-frequency management signal. In one embodiment, output signal 505 is the image signal (e.g., duplicate) of output signal 504. The output signal 504 directly inputs the low frequency management signal into a negative terminal of the comparator 501 and the output signal 505 directly inputs the low frequency management signal into the threshold level setting unit 502. The threshold level setting unit 502 responds to the input signal 505 and outputs threshold level signal 506 in real time, and the threshold level signal 506 is directly input into a positive terminal of the comparator 501. The comparator 501 corresponds to the input signal 504 and the dynamic threshold level signal 506 to output management signal 121. The management signal 121 is a recovered management signal with the same or similar qualities and/or characteristics as the management signal 118 of FIG. 3.

Referring back to FIG. 1, the intersecting transmission management unit 106 responds to a control signal 122 from the management unit 105, and switches the input/output signal to realize and/or enable (i) fault diagnosis on the fiber link and/or (ii) management of the optical network.

Figure 6A:
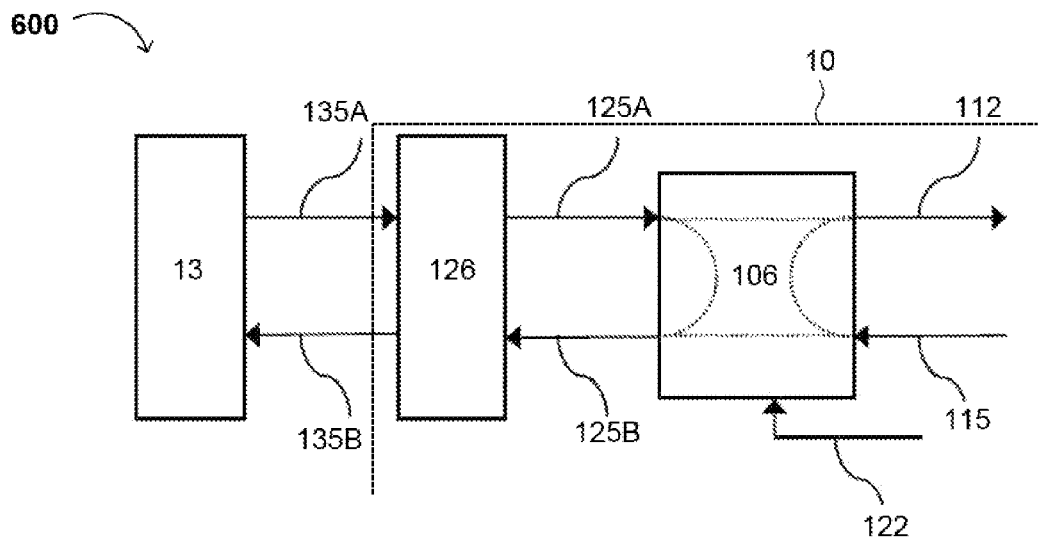
FIG. 6A shows exemplary input/output signal management using the present intersecting transmission management unit.

FIG. 6A shows an exemplary input/output management system 600, comprising an intersecting management unit 106, an interface 126 (e.g., host interface) for transceiver 10, and a host 13. The data signal 135 (see, e.g., FIG. 1) includes (i) an input data signal 135A (FIG. 6A) transmitted to the transceiver 10 from the host 13 and (ii) an output data signal 135B transmitted to the host 13 from the transceiver 10. A signal 125 (see, e.g., FIG. 1) includes a data signal 125A transmitted to the transmission management unit 106 and a data signal 125B transmitted from the transmission management unit 106 to the interface 126. A data signal 112 is transmitted from the transmission management unit 106 to the driver 101 (e.g., see FIG. 1). A data signal 115 is transmitted from the amplifier 103 (FIG. 1) to the transmission management unit 106. A control signal 122 is transmitted from the management unit 105 (FIG. 1) to the transmission management unit 106.

As shown by the dashed lines in FIG. 6A, the transmission management unit 106, which receives the control signal 122 from the management unit 105 (FIG. 1), recognizes the intersecting transmissions of the data signals that are received by transmitter 10 and that are to be transmitted by transceiver 10. In one embodiment, there are four (4) transmission modes:

Data signal 125A is transmitted to the intersecting transmission management unit 106, which transmits the data signal 112, and data signal 115 is transmitted to the intersecting transmission management unit 106, which transmits the data signal 125B (normal transmission mode);

Data signal 125A is transmitted to the intersecting transmission management unit 106, which transmits data signal 125B. Meanwhile, the intersecting transmission management unit 106 shuts down output signal 112 and input signal 115 (host or electrical link test mode);

Data signal 115 is transmitted to the intersecting transmission management unit 106, which transmits data signal 112. Meanwhile, the intersecting transmission management unit 106 shuts down output signal 125B and input signal 125A (optical link test mode); and The intersecting transmission management unit 606 shuts down all input or output signals (shut down mode).

These modes effectively enable fault diagnosis on the fiber link and management of the optical network.

Figure 6B:
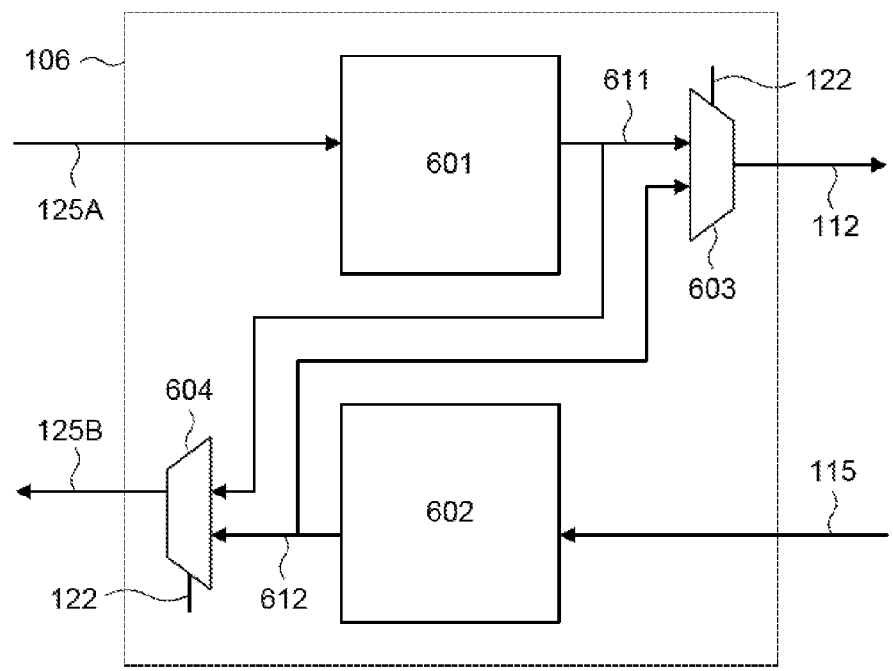
FIG. 6B shows exemplary circuitry for an intersecting transmission management unit.

FIG. 6B shows exemplary circuitry for the transmission management unit 106. For example, transmission management unit 106 may comprise a first FIFO (first-in, first-out) buffer 601 and a second FIFO buffer 602. First FIFO buffer 601 receives data signal 125A, and second FIFO buffer 602 receives data signal 115. The transmission management unit 106 also includes first and second multiplexers 603 and 604 at the respective outputs of each of first and second FIFO buffers 601 and 602. Each of the multiplexers 603 and 604 receives the output of each of the FIFO buffers 601 and 602. Depending on the state of the multiplexer control signal 122, the multiplexer 603 selects either the output of FIFO 601 (normal transmission mode) or the output 612 of FIFO 602 (optical link test mode) as the data signal 112, and the multiplexer 604 selects either the output 612 of FIFO 602 (normal transmission mode) or the output 611 of FIFO 601 (host link test mode) as the output data signal 125B. A further state of the control signal 122 can cause a high impedance at data signal 112 and output data signal 125B (shut down mode). Thus, control signal 122 may comprise a multibit signal, and multiplexers 603 and 604 may comprise three-statable transistors. Alternatively, the transmission management unit 106 may comprise a four-port FIFO buffer, configured with two input ports and two output ports. It is well within the level of skill in the art to design and implement alternative logic and/or circuitry configured to perform the functions of each of the modes described herein.

Referring back to FIG. 1, the management unit 105 communicates with the management signal driving unit 110 and the management signal recovery unit 111 (e.g., via a serial port) to enable transmission and receipt of management data. A host management unit 131 can communicate with the management unit 105 via a serial port (e.g., 133 and/or 116) to enable reading of management data and transmission/receipt of management command(s) in the optical network.

Figure 7:
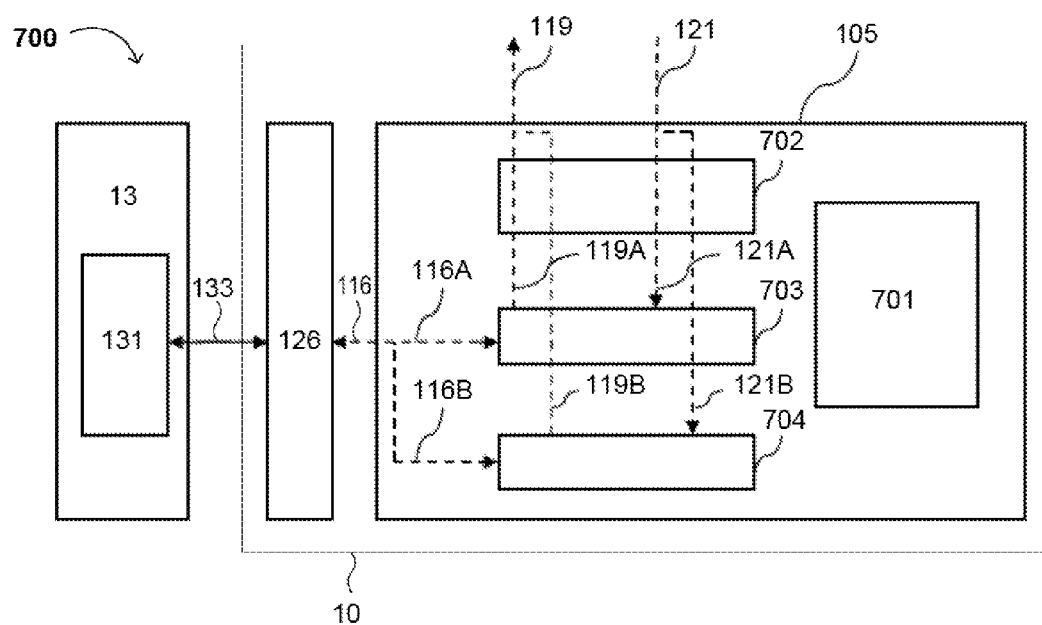
FIG. 7 illustrates exemplary circuitry for transmission and receipt of management data from the management unit.

FIG. 7 shows an exemplary embodiment of circuitry for transmission and/or receipt of management data for use in the system 700. The system 700 comprises host 13 and transceiver management unit 105. Management unit 105 communicates with host management unit 131 over communication signals 116 and 133 and also over signal 134 (FIG. 1). Communication signal 116 includes a signal 116A that communicates with a transmission data storage unit 703 and a signal 116B that communicates with a transmission command storage unit 704. Interface 126 connects the transceiver 10 and the host 13. The management unit 105 may comprise a micro-controller 701, a general storage unit 702, the transmission data storage unit 703 and the transmission command storage unit 704. Alternatively, micro-controller 701 may comprise a microprocessor, signal processor (e.g., DSP), FPGA or ASIC.

A management signal 119 is transmitted by the management unit 105, which includes a management signal 119A transmitted from the transmission data storage unit 703 and a management signal 119B transmitted from the transmission command storage unit 704. A (recovered) management signal 121 is received by the management unit 105, which includes a management signal 121A received by the transmission data storage unit 703 and a management signal 121B received by the transmission command storage unit 704.

All management data and management command(s) that are transmitted to a distal end (e.g., a network device) are respectively stored in the transmission data storage unit 703 and the transmission command storage unit 704 in management unit 105. The micro-controller 701 in the management unit 105 automatically transmits data and/or command(s) stored in the transmission data storage unit 703 and the transmission command storage unit 704 to the management signal driving unit 110 by coding via signal 119A and signal 119B. Simultaneously, the management unit 105 receives the (recovered) management signal 121 from the management signal recovery unit 111, and the micro-controller 701 stores received management data and/or command(s) in the transmission data storage unit 703 and the transmission command storage unit 704 via signals 121A and 121B. The management unit 131 of the host 13 communicates with the management unit 105 of the transceiver 10 via interface 126 and signals 116A and 116B. Thus, steps involved in processing and/or management of data and/or command(s) may include the following: 1) via interface 126 and signal 116A, the management unit 131 of the host 13 reads the management data transmitted from the distal end (e.g., a network device) from the transmission data storage unit 703 of the management unit 105, and writes proximal management data to be transmitted to other devices in the network to data storage unit 703; and 2) via interface 126 and signal 116B, the management unit 131 reads the command(s) transmitted from the distal end (e.g., a network device) from the transmission command storage unit 704 in the management unit 105, and writes distal management command(s) to be transmitted to other devices in the network to transmission command storage unit 704.

Referring back to FIG. 1, the system voltage sensing unit 109 and the power storage unit 108 monitor the power supply of the transceiver 10 and the host 13. When the voltage value obtained by the system voltage unit 109 of the transceiver 10 is lower than the minimum working voltage, the management unit 105 will immediately switch off a supply circuit 117 (provided through interface 126) and switch on the power storage unit 108 to maintain normal working function(s) of the transceiver 10 for a period of time. In one embodiment, the period of time is sufficient to perform fault diagnosis and transmission(s) of data and/or commands stored in memories and/or buffers in transceiver 10. Optionally, the period of time is sufficient to back up data and commands stored in data storage unit 703, transmission command storage unit 704, and optionally in general storage unit 702. Also, during the period of time that the power storage unit 108 maintains power to the transceiver 10, the management unit 105 can conduct and transmit fault diagnosis to the management signal driving unit 110. The diagnosis data can be transmitted to a distal transceiver (e.g., elsewhere in the network) via the driver 101 and transmitter 102, to realize and/or enable the submission of fault information. The transceiver interface 126 is used to connect to and recognize communications between the transceiver 10 and the host 13.

Figure 8:
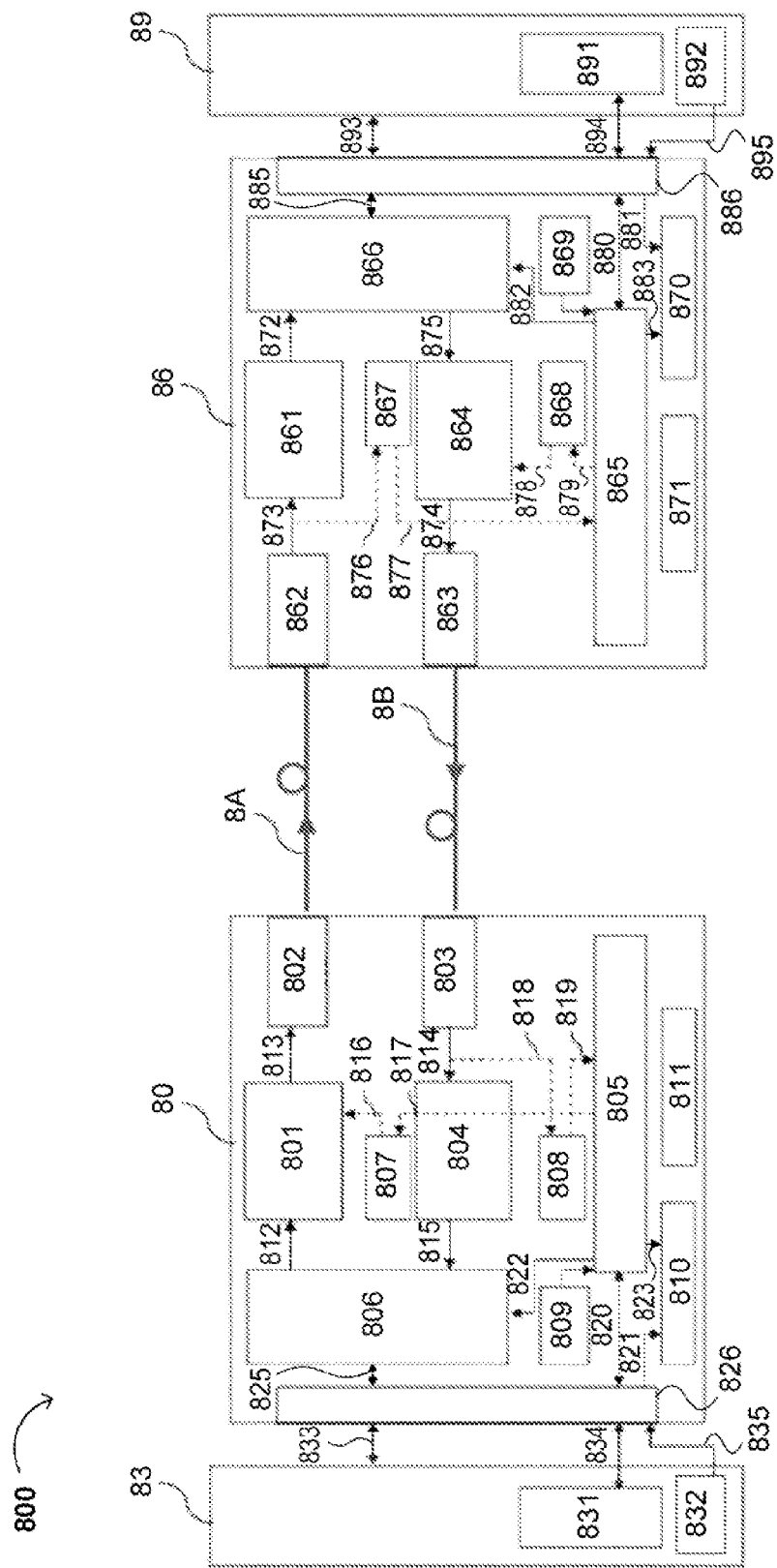
FIG. 8 illustrates an exemplary system and/or network consistent with the present invention.

FIG. 8 shows an exemplary embodiment of an optical and/or optoelectrical communication network 800 that comprises a proximal host 83, a proximal transceiver 80, a distal host 89, a distal transceiver 86, a fiber 8A that connects the transmitter 802 of the proximal receiver 80 and the receiver 862 of the distal transceiver 86, and a fiber 8B that connects a transmitter 863 of the distal transceiver 86 and the receiver 803 of the proximal transceiver 80. Thus, the proximal and distal transceivers 80 and 86 are connected by the optical fibers 8A and 8B. In one embodiment, the optical fibers 8A and 8B can be replaced with a single fiber carrying different signals (e.g., from proximal transceiver 80 to distal transceiver 86, or from distal transceiver 86 to proximal transceiver 80) at different wavelengths of light.

Various embodiments of the present invention enable parallel transmission of data signals and management signals over a single fiber without changing the transmission wavelength of either the data signal or the management signal. Furthermore, the present optical transceiver enables optical interface management (e.g., optical layer management) between the proximal host 83 and the distal host 89, as shown in FIG. 8.

The management unit 805 of the proximal transceiver 80 automatically transmits data stored in the management unit 805 (e.g., a transmission data storage unit and/or management command storage unit) using a management signal 817 to the distal transceiver 86 via (i) a management signal driving unit 807 in the proximal transceiver 80, (ii) the driver 801, (iii) the transmitter 802, and (iv) the optical fiber 8A. The transmitted signal is received by the receiver 862 of the distal transceiver 86, and a management signal 876 is recovered (or converted) therefrom. The recovered signal 876 has the same or similar qualities and/or characteristics as signal 816, and is automatically stored in a management unit 865 (e.g., a transmission data storage unit and/or management command storage unit) in the distal transceiver 86. A host management unit 891 of the distal host 89 reads out management data from the management unit 865 via signals 894 and 880. The management signal 817 includes real-time (status) management data for the host 89 and the transceiver 86, including one or more control signals from the proximal host 83 to the distal transceiver 86 and/or to the distal host 89.

The management unit 865 of the distal transceiver 86 automatically transmits data stored therein (e.g., in a transmission data storage unit and/or management command storage unit) using the management signal 879 to the proximal transceiver 80 via (i) the management signal driving unit 868 of distal transceiver 86, (ii) the driver 864, (iii) a transmitter 863, and (iv) the optical fiber 8B. The transmitted signal is received by the receiver 803 of the proximal transceiver 80, and a management signal 819 is recovered. The recovered signal 819 has the same or similar qualities or characteristics as signal 878, and is automatically stored in management unit 805 (e.g., the transmission data storage unit and/or management command storage unit) in the proximal transceiver 80. The management unit 831 of the proximal host 83 reads out the management data from the management unit 805 via signals 820 and 834. The management signal includes real-time status data from the distal host 89 and the distal transceiver 86, including one or more control signals from the distal host 89 to the proximal transceiver 80 and/or the proximal host 83.

FIG. 8 also shows circuitry configured to perform fault diagnosis and management of the present network. Optical network management and fault diagnosis over an optical fiber link are realized by an electrical interface loopback function, a proximal optical interface loopback function and/or a distal optical interface loopback function.

A detailed implementation of the electrical interface loopback function may include: 1) the proximal host management unit 831 transmits a management signal to the proximal transceiver management unit 805 via the management signals 820 and 834; 2) the management unit 805 transmits a management command to the distal transceiver 86 via the proximal management signal driving unit 807, the proximal driver 801, the proximal transmitter 802 and the optical fiber 8A; 3) the distal transceiver 86 receives and/or recovers the management signal via the distal receiver 862 and distal management signal recovery unit 867, and transmits the recovered signal to the distal management unit 865; and 4) the distal management unit 865 responds to a received management command, and controls the distal transceiver intersecting transmission unit 866 via control signal 882 to return a received data signal from the distal host 89 directly back to the distal host 89. The path of such a signal in the intersecting transmission unit 866 is exemplified in the intersecting transmission unit 106 of FIG. 6A. For example, the host 13 transmits a data signal 135A to a transceiver interface (e.g., 126), which transmits data signal 125A to the intersecting transmission management unit 106, which then returns the data signal on data signal 125B and data signal 135B back to the host 13.

A detailed implementation of the proximal optical interface loopback function may include: 1) the proximal host management unit 831 transmits a management signal to the proximal transceiver management unit 805 via signals 820 and 834; 2) the management unit 805 (i) responds to the management signal 820 from the proximal host management unit 831, and (ii) controls the proximal transceiver transmission management unit 806 via the control signal 822 to return received data 815 via the driver 801 and the transmitter 802 back to the distal end (e.g., distal transceiver 86), rather than to the proximal host 83. When executing the proximal optical interface loopback function, the path of such a signal in the intersecting transmission unit 806 is exemplified in FIG. 8. For example, the host 89 transmits a data signal 893 to a transceiver interface (e.g., 886), which transmits data signal 885 to the intersecting transmission management unit 866, which then transmits received data signal 875 to the driver 864, which then transmits an electrical signal 874 to the transmitter 863, which transmits an optical signal over the optical fiber 8B to the proximate receiver 803, which transmits an electrical signal 814 to the amplifier 804, which then can transmit received data signal 815 to the transmission management unit 806, which returns the data signal on bus 812 to the driver 801, which then transmits a modulation signal 813 to the transmitter 802, which provides an optical signal to the optical fiber 8A, which then carries the signal to distal receiver 862, which transmits a modulation signal 873 to the distal transceiver driver 861, which then transmits data signal 872 to the transmission management unit 866, which then can transmit a signal 885 and 893 back to the host 89.

A detailed implementation of the distal optical interface loopback function may include: 1) the proximal host management unit 831 transmits a management signal to the proximal transceiver management unit 805 via signals 820 and 834; 2) the management unit 805 transmits a received management signal 817 to the distal transceiver 86 via the management signal driving unit 807, the driver 801, the transmitter 802, and the optical fiber 8A; 3) the distal transceiver 86 receives and recovers the management signal from the proximal transceiver 80 via the receiver 862 and the management signal recovery unit 867, and transmits the recovered management signal 877 to the distal transceiver management unit 865; and 4) the distal management unit 865 (i) responds to the proximal host management unit 831, and (ii) controls the distal transceiver transmission management unit 866 via the control signal 882 that returns received data 872 back on signal 875 via the driver 864 and the transmitter 863 to the proximal transceiver 80, rather than to the distal host 89. When executing the distal optical interface return function, the path of such a signal in the intersecting transmission unit 866 is exemplified in FIG. 8. For example, the host 83 transmits a data signal 833 to a transceiver interface (e.g., 826), which transmits data signal 825 to the intersecting transmission management unit 806, which transmits data signal 812 to the driver 801, which then transmits a modulation signal 813 to the transmitter 802, which transmits an optical signal over the optical fiber 8A to the distal receiver 862, which transmits a modulation signal 873 to the distal transceiver amplifier 861, which then can transmit received data signal 872 onto the intersecting transmission management unit 866, which then returns the received data signal 875 to the driver 864, which transmits an electrical signal 874 to the transmitter 863, which transmits an optical signal over the optical fiber 8B to the proximal receiver 803, which transmits the electrical signal 814 to the proximal amplifier 804, which then transmits received signal 815 to the intersecting transmission management unit 806, which transmits the data signal 825 back to the host 83 (through interface 826 and data bus 833).

The present transceiver and/or system advantageously provide power monitoring for fault diagnosis over the optical and/or optoelectrical network. According to FIG. 8, the proximal host 86 includes a power supply 832 coupled to the interface 826 via signal 835, and the distal host 89 includes a power supply 892 coupled to the interface 886 via the signal 895. A detailed implementation of the power monitoring function may include: 1) when the voltage of the proximal host 83 or transceiver 80 is below a normal working voltage, the system voltage sensing unit 809 can activate the proximal management unit 805 to switch off the transceiver power supply unit 810 via a signal 823; 2) the power storage unit 811 may be automatically switched on to maintain normal operation of the transceiver 80 for a period of time; and 3) the proximal management unit 805 automatically transmits a fault signal to the distal transceiver 86 using the management signal, via the management signal driving unit 807, the driver 801, and the transmitter 802. Similarly, if the voltage of the distal host 89 and/or the distal transceiver 86 is below a normal working voltage, the system voltage sensing unit 870 can activate the proximal management unit 865 to switch off the transceiver power supply unit 870 via a signal 883 and automatically switch on the power storage unit 871 to maintain operation of the transceiver 86 for a period of time. The distal management unit 865 will automatically transmit a fault signal to the proximal transceiver 80 using the management signal, via the management signal driving unit 868, the driver 864, and the transmitter 863.

Thus, embodiments of the present invention pertain to circuits, architectures, systems, and methods for data communications in a network using an optical and/or optoelectrical transceiver which realizes parallel and/or simultaneous transmission of data and management signals via optical fibers, without affecting data signal transmissions transmitted via the optical fiber. Furthermore, the present invention provides a fault diagnosis function for an optical fiber link. The present invention advantageously uses modulation of a driver to easily realize an effective merger or mixing of management and data signals. In addition, the present invention advantageously recovers a transmitted management signal at a receiving end (e.g., using a band-pass filter and a dynamic comparison). Furthermore, the present invention advantageously provides management of a proximal and/or distal optical or optoelectronic transceiver and a distal end system in an optical or optoelectronic network. Compared to conventional solutions, the implementation of the present invention is more effective, and provides efficient control of network expenditures.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

Thus, this utility model shall not be limited to aforementioned embodiments. The utility model can be extended to any combination of new characteristics disclosed, or combination of any new method or new process disclosed in the document.

What is claimed is:

1. A transceiver, comprising:
an interface;
a transmission management unit connected to said interface;
a driver connected to said transmission management unit;
a management signal driving unit connected to said driver;
an optical transmitter;
an optical receiver;
an amplifier connected to said optical receiver and to said transmission management unit;
a management signal recovery unit connected to said optical receiver;
a management unit connected to said management signal recovery unit, to said management signal driving unit, to said interface, and to said transmission management unit, wherein said management unit comprises a transmission data storage unit and a transmission command storage unit, said management unit configured to transmit data stored in said transmission data storage unit and a command stored in said transmission command storage unit to said management signal driving unit, said management unit further configured to store data received from said management signal recovery unit in said transmission data storage unit and a command received from said management signal recovery unit in said transmission command storage unit;
a power storage unit connected to said management unit;
a power supply unit connected to said management unit; and
a voltage sensing unit that monitors a voltage and/or voltage status of a proximal host and/or said transceiver, and when (i) said voltage from said power supply unit is lower than normal or (ii) there is a sudden loss of power from said power supply unit to said proximal host and/or said transceiver, said management unit switches off said power supply unit and switches on said power storage unit and then said power storage unit supplies power to said transceiver for a period of time, and when an abnormal voltage status is detected in said transceiver, said voltage sensing unit sends a signal to a remote host to recognize or enable fault diagnosis over a link between said remote host and said transceiver.

2. The transceiver of claim 1, wherein said driver comprises a first current supply configured to modulate a data signal, and said management signal driving unit comprises a second current supply used to further modulate said data signal.

3. The transceiver of claim 1, wherein said management signal recovery unit comprises a band-pass filter, a threshold level setting unit and a comparator, wherein a first output of said band-pass filter is input to said threshold level setting unit and a second output of said band-pass filter is input to said comparator, and an output of said threshold level setting unit is input to said comparator, wherein said comparator compares said first output of said band-pass filter to said output of said threshold level setting unit.

4. The transceiver of claim 1, wherein said management unit further comprises a micro-controller, said micro-controller (i) transmitting said data stored in said transmission data storage unit and said command stored in said transmission command storage unit to said management signal driving unit, and (ii) storing said data received from said management signal recovery unit in said transmission data storage unit and said command received from said management signal recovery unit in said transmission command storage unit.

5. The transceiver of claim 1, wherein said transmission management unit receives a control signal from said management unit, said control signal controlling a transmission mode of said transceiver.

6. The transceiver of claim 5, wherein said transmission mode is one of a plurality of available transmission modes, wherein said available transmission modes include a normal transmission mode, a host or electrical link test mode, an optical link test mode, and a shut down mode.

7. The transceiver of claim 6, wherein:
in said host or electrical link test mode, said transmission management unit receives a data signal from said host and transmits said data signal to said host, and shuts down modulation signal and/or said optical signal and said external optical signal and/or said electrical signal; and
in said optical link test mode, said transmission management unit receives said external optical signal and/or said electrical signal and transmits modulation signal and/or said optical signal, and shuts down said data signal from said host and to said host.

8. The transceiver of claim 1, wherein said management unit transmits a management command to a remote transceiver via said management signal driving unit, said driver, and said transmitter in response to an external control signal; said receiver receives a recovered management signal from said remote transceiver; and said management unit sends a transmission mode control signal to said transmission management unit to return a received data signal from an external host back to said external host.

9. The transceiver of claim 1, wherein said management unit sends a mode control signal to said transmission management unit, and said transmission management unit returns data received from a remote transceiver back to said remote transceiver using said driver and said transmitter in response to said mode control signal.

10. The transceiver of claim 1, wherein said management unit sends a management signal to a remote transceiver using said management signal driving unit, said driver, and said transmitter in response to an external management signal, said management signal controlling said remote transceiver to return data transmitted to said remote transceiver by said driver and said transmitter back to said transceiver.

11. A transceiver, comprising:
a management unit configured to manage receipt and transmission of signals, said management unit comprising a transmission data storage unit and a transmission command storage unit, said management unit configured to (i) transmit data stored in said transmission data storage unit and commands stored in said transmission command storage unit to a management signal driving unit, and (ii) store data received from said management signal recovery unit in said transmission data storage unit and commands received from a management signal recovery unit in said transmission command storage unit;
said management signal driving unit configured to receive and respond to a management signal from said management unit;
a transmission management unit configured to respond to a control signal from said management unit;
a driver configured to respond to a data signal from said transmission management unit and a management information signal from said management signal driving unit, and transmit a modulation signal representing a merger of said data signal and said management information signal;
a transmitter configured to receive said modulation signal and transmit an optical signal;
a receiver configured to receive an external optical signal and convert said external optical signal to an electrical signal;
an amplifier configured to receive said electrical signal and transmit said electrical signal to said transmission management unit;
said management signal recovery unit configured to recover a received management signal from said electrical signal or a substantial duplicate thereof;
a power supply unit;
a power storage unit; and
a voltage sensing unit configured to monitor a voltage and/or voltage status of said transceiver and/or a host coupled to said transceiver, and when (i) said voltage from said power supply unit is lower than normal or (ii) there is a sudden loss of power from said power supply unit to said host and/or said transceiver, said management unit switches off said power supply unit and switches on said power storage unit and then said power storage unit supplies power to said transceiver for a period of time, and when an abnormal voltage status is detected in said transceiver, said voltage sensing unit sends a signal to a remote host to recognize or enable fault diagnosis over a link between said remote host and said transceiver.

12. The transceiver of claim 11, wherein said driver modulates said data signal to an analog modulation signal by modulating a first current supply using said management signal, and the management signal driving unit comprises a second current supply configured to modulate said management signal received from said management unit to an analog management signal.

13. The transceiver of claim 12, wherein said data signal has a higher frequency than said management signal.

14. The transceiver of claim 11, wherein said management unit further comprises a micro-controller that transmits said data stored in transmission data storage unit and said transmission command storage unit to said management signal driving unit and stores said received management data in said transmission data storage unit and said transmission command storage unit.

15. The transceiver of claim 11, wherein said management signal recovery unit comprises a band-pass filter, a threshold level setting unit and a comparator, wherein a first output of said band-pass filter is input to said threshold level setting unit and a second output of said band-pass filter is input to said comparator, and an output of said threshold level setting unit is input to said comparator, wherein said comparator compares said first output of said band-pass filter to said output of said threshold level setting unit.

16. The transceiver of claim 11, wherein said transceiver is housed in a package selected from the group consisting of GBIC-, SFF-, SFP-, SFP+-, XFP-, X2-, XENPEK- and transponder-compliant packages.

17. The transceiver of claim 11, wherein said transmission management unit implements one of a plurality of modes in response to a control signal from said management unit, said plurality of modes including a normal transmission mode, an optical link test mode, and an electrical link test mode.

18. The transceiver of claim 17, wherein:
in said electrical link test mode, said transmission management unit receives a data signal from said host and transmits said data signal to said host, and shuts down modulation signal and/or said optical signal and said external optical signal and/or said electrical signal; and
in said optical link test mode, said transmission management unit receives said external optical signal and/or said electrical signal and transmits modulation signal and/or said optical signal, and shuts down said data signal from said host and to said host.

19. The transceiver of claim 11, wherein said management unit transmits a management command to a remote transceiver via said management signal driving unit, said driver, and said transmitter in response to an external control signal; said receiver receives a recovered management signal from said remote transceiver; and said management unit sends a transmission mode control signal to said transmission management unit to return a received data signal from an external host back to said external host.

20. The transceiver of claim 11, wherein said management unit sends a mode control signal to said transmission management unit, and said transmission management unit returns data received from a remote transceiver back to said remote transceiver using said driver and said transmitter in response to said mode control signal.

21. The transceiver of claim 11, wherein said management unit sends a management signal to a remote transceiver using said management signal driving unit, said driver, and said transmitter in response to an external management signal, said management signal controlling said remote transceiver to return data transmitted to said remote transceiver by said driver and said transmitter back to said transceiver.

22. A method of transmitting data and management information, comprising:
generating first management information in a host, said first management information comprising first management data and a first management command, said host writing said first management data to a transmission data storage unit and writing said first management command to a transmission command storage unit;

merging, mixing or superposing said management information with a data signal to form a modulation signal;

transmitting said modulation signal to a distal device in a network including said host;

receiving second management information from said distal device, said second management information comprising second management data and a second management command, said second management data also stored in said transmission data storage unit and said second management command also stored in said transmission command storage unit, said host reading said second management data from said transmission data storage unit and reading said second management command from said transmission command storage unit;

recovering said first management information from said modulation signal in said distal device; and monitoring a voltage and/or voltage status of (a) a transceiver comprising said transmission data storage unit and said transmission command storage unit, and/or (b) a host coupled to said transceiver, and when (i) said voltage from a power supply unit in said transceiver is lower than normal or (ii) there is a sudden loss of power to said host and/or said transceiver, switching off said power supply unit and switching on a power storage unit, and supplying power to said transceiver for a period of time, and when an abnormal voltage status is detected in said transceiver, sending a signal to a remote host to recognize or enable fault diagnosis over a link between said remote host and said transceiver.

23. The method of claim 22, wherein said transceiver implements one of a plurality of operational modes in response to a control signal, said plurality of modes including a normal transmission mode, an optical link test mode, and an electrical link test mode.

24. The method of claim 23, wherein:

in said electrical link test mode, said transmission management unit receives a data signal from said host and transmits said data signal to said host, and shuts down modulation signal and/or said optical signal and said external optical signal and/or said electrical signal; and in said optical link test mode, said transmission management unit receives said external optical signal and/or said electrical signal and transmits modulation signal and/or said optical signal, and shuts down said data signal from said host and to said host.

* * * * *